United States Patent [19]
Debart

[11] 3,825,340
[45] July 23, 1974

[54] FREQUENCY MODULATION TELEMETRY SYSTEM

[75] Inventor: Hubert Debart, Meudon, France

[73] Assignee: Compagnie Generale D'Electricite, Paris, France

[22] Filed: Dec. 4, 1972

[21] Appl. No.: 311,614

[30] Foreign Application Priority Data
Dec. 3, 1971 France ............................... 71.43502

[52] U.S. Cl. ........................... 356/5, 356/28, 343/8, 343/9, 343/17.2 R
[51] Int. Cl. .............................................. G01p 3/36
[58] Field of Search ..... 356/4, 5, 28; 343/8, 17.2 R, 343/9

[56] References Cited
UNITED STATES PATENTS

| | | | |
|---|---|---|---|
| 3,055,258 | 9/1962 | Hurvitz | 343/17.2 R |
| 3,149,326 | 9/1964 | Naidich | 343/9 |
| 3,362,024 | 1/1968 | Badewitz | 343/9 |
| 3,546,695 | 12/1970 | Freedman | 343/17.2 R |

OTHER PUBLICATIONS
Lean, IBM Tech. Discl. Bulletin, Vol. 11, No. 8, 1-1969.

Primary Examiner—Richard A. Farley
Assistant Examiner—S. C. Buczinski
Attorney, Agent, or Firm—Sughrue, Rothwell, Mion, Zinn & Macpeak

[57] ABSTRACT

A frequency modulation telemetry system in which the radiation sent out towards the target is that of a laser, frequency modulated according to a pseudo-random sequence of increasing and decreasing ramps. The recognition of the sequence, on return, is effected through time intervals between the successive passes of the return frequency through a fixed reference frequency.

5 Claims, 2 Drawing Figures

FREQUENCY MODULATION TELEMETRY SYSTEM

BACKGROUND OF THE INVENTION

1. Field of the Invention

The present invention concerns telemetry, that is, the measuring of the distance of a target, and, more particularly, frequency modulation telemetry.

2. Description of the Prior Art

It is known that numerous telemetry systems comprise, on the one hand, a source emitting a modulated radiation towards the target whose distance is to be measured, and on the other hand, a receiver recognizing the modulation of that radiation when it it sent back by the target towards the telemetry system. The radiation may be of various types: mechanical, such as ultrasonic, or electromagnetic, such as in radars or in laser systems. The measuring of the time separating the emission from the receiving, or more precisely of the time delay between the modulation on emitting and on receiving, constitutes a measurement of the distance of the target, on condition, of course, that the propagation speed of the radiation in the ambient medium be known. The choice of a frequency modulation enables the return signal to be better distinguished from interference.

It is known, moreover, when the radiation is modulated, not in frequency, but in amplitude, that giving the modulation signal the form of a pseudo-random sequence, increases the accuracy of the measuring of a distance even with interference. A pseudo-random sequence, a binary sequence, for example, is a succession of signals of two different types in which certain signals of a first type are immediately followed by a signal of the second type, and certain other signals of that first type are immediately followed by another signal of that same first type. The solutions which have just been mentioned do not, however, provide the necessary accuracy.

SUMMARY OF THE INVENTION

One aim of the present invention is to combine the advantages of the use of pseudo-random sequences and, at least partly, those of frequency modulation, with equipment which remains simple. The frequency modulation telemetry according to the present invention comprises, in a known way, a scanning source suitable for causing an alternating scanning signal having an adjustable frequency which is propagated towards a target. The target is capable of sending back to the telemetry system an alternating response signal whose frequency follows the variations in the frequency of the scanning signal. The scanning signal also undergoes the aforementioned frequency modulation. It may be either constituted by the radiation itself, of the undulatory type, hence resulting in an alternating variation of a physical parameter, such as an electric field, a pressure, or a radiation, in which case it is propagated towards the target with that radiation. The target may be of very various types. In most cases, it will be passive, that is, it will reflect or diffuse back to the telemetry system a slight fraction of the radiation it has received. But it may also be active, that is, send back a radiation whose power is greater than that which it receives from that telemetry system. In the latter case, it is necessary for the frequency of the radiation emitted by the target to follow that of the radiation it receives, so that in the radiation sent back, that is, in the response signal, the frequency modulation applied to the scanning signal may be recognized.

The telemetry system according to the invention furthermore comprises a modulation generator for controlling the scanning source with a modulation signal so as to generate a variation in the frequency of the scanning signal, according to a predetermined pattern. That pattern is a function of time, it being understood that the original frequency variation responding to that pattern may be any given frequency. That modulation generator supplies, moreover, a start signal synchronized with that variation, so as to define the position of that variation in time. The telemetry system, according to the invention, furthermore comprises a receiving assembly sensitive to a variation in the frequency of the response signal according to the predetermined pattern. The function of that receiving assembly is, starting from the response signal, to supply a return signal defining the position, in time, of the modulation carried by the response signal, that is, the return signal must be synchronized with the frequency variation of the response signal according to the aforementioned predetermined pattern.

The telemetry system according to the invention furthermore comprises a chronometer receiving the aforementioned start and return signals, which measure the time interval between these two signals. That chronometer thus provides a signal for indicating the distance determined by the interval and representing the distance of the target.

If the start and return signals are synchronized in the same way with the scanning signal and with the response signal, and if the propagation speed of the radiation in the medium separating the telemetry system from the target is constant and known, the aforementioned distance indicating signal is proportional to the time interval between the start and return signals and to the distance of the target. The elements which have just been mentioned are known in frequency modulation telemetry systems.

The telemetry system according to the invention is characterized in that the aforementioned receiving assembly comprises a frequency comparator supplying a pass signal each time the frequency of the response signal is equal to a predetermined reference frequency. Indeed, starting from the time when the frequency of the response signal is equal to the reference frequency, the receiving assembly makes it possible to determine the distance of the target according to the invention. For that purpose, the predetermined pattern assigning the frequency of the scanning signal comprises a succession of ramps of two types, that is, increasing ramps and decreasing ramps. These ramps are, to great advantage, linear, that is, they make the frequency of the scanning signal vary linearly as a function of time, between a low frequency and a high frequency. The duration of these ramps is chosen so as to be the same for the increasing ramps and for the decreasing ramps. That predetermined duration is called a "pseudo period." These ramps are spaced out in a pseudo-random sequence. As for the aforementioned reference frequency, it is, to great advantage, the average frequency between above-mentioned high and low frequencies.

The pass signals are used as follows: they are received by a time comparator which provides a comparing signal which has a first value each time the time interval between two successive pass signals is between two predetermined values on either side of the pseudo period, and has a second value each time that time interval is not between these two values. That comparing signal is called hereafter an "equality signal" when it has its first value, which occurs when the time interval between the two pass signals is close to the pseudo period, that is, it may be considered, with a certain approximation, as equal to that pseudo period. That approximation is made necessary because if the target moves away or moves nearer, the Doppler effect makes the time intervals, within the response signal, smaller or greater than if that target remained at a constant distance from the telemetry system. Now, here, the important thing is not to measure the Doppler effect, but to recognize the modulation of the response signal. In the case where the comparison signal has its second value, that is, when the time interval is not between the two aforementioned predetermined values, the comparing signal is called the "inequality signal."

A sequence comparator records the succession order of the two aforementioned values of the comparing signal, and supplies the return signal when it has received a sequence of these two values substantially identical to the sequence it should receive if the pass signals supplied by the time comparator actually correspond to a response signal subsequent to the sending of a scanning signal.

It may be preferable to supply the return signal even when the sequence received by the sequence comparator is not absolutely identical to the sequence it should receive. If a noise affects the response signal, that is, if there is a probability of error in the duration of the time intervals, there will still be, as long as the noise level is not too high, an instant when the correlation between the sequence effectively received and that which should have been received will have a net maximum. It is at that instant that the return signal will be supplied.

Whatever solution is chosen in this respect, the sequence comparator should compare the sequence of the values of the comparing signal with a predetermined sequence, for it corresponds to the aforementioned previously determined pattern, as follows: an equality signal corresponds to a succession of two ramps of a said same type, and an inequality signal corresponds to a succession of two ramps of two different types. Indeed, when two ramps of a same type, for example, two increasing ramps, succeed one another, the passing of the response signal frequency through the reference frequency is effected at two instants separated by the pseudo period, neglecting the influence of the Dopper effect on the time intervals within the response signal. That influence is not very great, even if the shift of the frequency by Doppler effect is very great. When, for example, an increasing ramp succeeds a decreasing ramp, and when the Doppler effect substantially modifies the average frequency of the response signal and makes it greater than the reference frequency, it is easy to see that the time interval between the two pass instants through the reference frequency becomes less than the pseudo period, thus making it possible to distinguish it from an interval substantially equal to the pseudo period and to recognize a sequence so that it is possible to distinguish from the predetermined sequence in question.

If it is required that the telemetry system according to the present invention measures not only the distance, but also a relative radial speed, the time comparator is, to great advantage designed to supply not only equality and inequality signals, but also, interval signals, each of which represents the value of the time interval between two successive pass signals. The time intervals which correspond to changes in the types of ramps depend upon the difference between the average frequency of the response signal and the reference frequency. The average frequency is affected by the Doppler effect and therefore depends on the radial speed of the target in relation to the telemetry system. Thus, an interval signal is supplied each time the time interval between two successive pass signals is not between two predetermined values on either side of the pseudo period, which advantageously corresponds to each inequality signal, and vice versa.

It is easy to see that the intervals which are longer than the pseudo period will be all the longer, and that the intervals which are shorter than the pseudo periods will be all the shorter, as the relative radial speed of the target is greater. Thus, the measuring of any of these intervals constitutes a measurement of speed. Nevertheless, it is an advantage to make a difference between the averages of the long intervals and of the short intervals, although that difference represents only the absolute value of the relative radial speed, that is, it may be the same if the target moves nearer or if it moves away at the same absolute speed in relation to the telemetry system. Therefore, it is useful to recognize the interval which should be long and those which should be short according to whether the target moves nearer or away. This is possible if, in that response signal, the signal which comprised the frequency pattern of the scanning signal has been recognized.

That recognition is indicated by the aforementioned return signal which was used for determining the distance. Thus, the telemetry system according to the invention may comprise a set of summing elements which receive the interval signals while retaining their succession order and supplies a summing signal representing the algebraic sum of a predetermined number of these signals, counting only the last interval signals received, and affecting predetermined algebraic signs to the interval signals according to their succession order.

When a return signal is supplied, that is, when a complete sequence of frequency ramps has been recognized, it is indeed necessary to take into account only interval signals corresponding to that complete sequence, and not those which may have been received previously. It is necessary to work out an algebraic sum, for the intervals which should be short, if the target moves nearer, and thus counted negatively, and the intervals which should be long and are counted positively.

It is, moreover, quite evident that, since the number of short intervals and long intervals which are taken into account is predetermined, it is an equivalent method to work out the sum of all the long signals or their average. As for the algebraic signs which are assigned to the various interval signals, it is quite evident that they must alternate, since a long interval must always be followed by a short interval. A speed indicator receives the summing signal and indicates its value when the return signal is supplied, since that value represents the relative radial speed of the target.

The summing signal may obviously be supplied permanently and vary according to the various signals received by the telemetry system, and be read only at the instant when the return signal is supplied. It is also possible to have the algebraic sum worked out by the set of summing elements only when the return signal has been supplied.

The aforementioned set of summing elements comprises, to great advantage, a shift register receiving interval signals and having a number of stages equal to the said predetermined number of interval signals. Each stage is capable of recording an interval signal and transferring its contents into the following stage when a new interval signal arrives in the register. Thus, a number of interval signals constantly equal to that which is necessary is retained. To work out the sum of the signals thus retained in the memory, an adder has a number of inputs equal to that of the stages of the shift register. Each input receives the recorded signal in a stage which corresponds to it. These inputs have alternate algebraic signs assigned to them as previously stated, and the aforementioned summing signal is the output signal of the adder.

If the aforementioned ramps are linear, and if the reference frequency is the average frequency between the low frequency and the high frequency of the scanning signal, the average frequency of the response signal will be equal to the reference frequency when the target is at a constant distance from the telemetry system, that is, when there is no Doppler effect.

In these conditions, it will be impossible to distinguish the long intervals from the short intervals, and it will not be possible to measure the distance from the target. The telemetry system will make it possible only to measure the distance from targets moving towards or moving away from the telemetry system. It is, however, evidently possible to choose a slightly different reference frequency. If, for example, that reference frequency is chosen higher than the average frequency of the scanning signal, the telemetry system will no longer be sensitive to targets moving towards the telemetry system at a certain speed, this permitting a selection of targets according to their relative radial speed.

BRIEF DESCRIPTION OF THE DRAWINGS

An example of the implementing of the present invention will be described herebelow with reference to the accompanying drawings, purely by way of an illustration, having no limiting character.

DESCRIPTION OF THE PREFERRED EMBODIMENT

Figure 1:
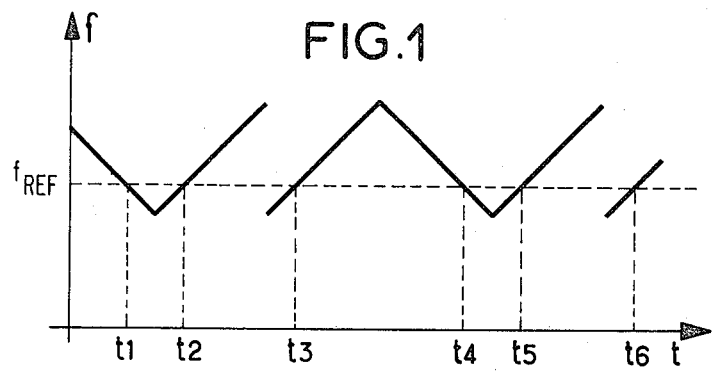
FIG. 1 shows a frequency variation diagram of a response signal as a function of time, according to the invention.

In FIG. 1, the frequency of the response signal is shown on the ordinate axis, and the time is shown on the abscissa. A certain number of increasing and decreasing ramps succeed one another in a pseudo random sequence. These ramps are shown in solid lines.

That same figure shows a fixed reference frequency in dotted lines. The frequency ramps shown are linear and all make the frequency of the response signal vary between a same high frequency and a same low frequency in a same time interval, which is the aforementioned time pseudo period. According to the figure, the fixed reference frequency is lower than the average frequency of the response signal, this meaning that the target is moving away. The aforementioned pass instants, that is, the instants when the frequency of the response signal is equal to the reference frequency, are shown in the figure by dashed vertical lines. It may be seen that the time intervals between these pass instants may be classed into three groups: a group coming from the short intervals, such as the interval $t1, t2$ and the interval $t4, t5$. These short intervals correspond to the fact that an increasing ramp succeeds a decreasing ramp. Medium intervals such as $t2, t3$ and $t5, t6$, are practically equal to the aforementioned pseudo period. Indeed, the example described refers to a laser telemetry system as will be explained further below, and the propagation speed of light is very great in relation to the speeds which must be obtained for the targets. This does not, however, prevent the Doppler shift from having an effect when it is applied to frequencies as high as those of the light radiation, this resulting in a substantial difference between the average frequency of the response signal and the reference frequency. Lastly, in FIG. 1, a long interval $t3, t4$, which corresponds to the succession of an increasing ramp and a decreasing ramp will be seen. In the example described, the reference frequency is supposed to be equal to the average frequency of the scanning frequency.

The function of the receiving assembly of the telemetry system according to the invention is, the measuring of the distance by detecting of the sequence of short, medium and long intervals between successive pass instants, and the measuring of the speed, by detecting of the difference between the average frequency of the scanning sequence and the frequency of the response signal by the difference which exists between the duration of the long intervals and the duration of the short intervals.

Figure 2:
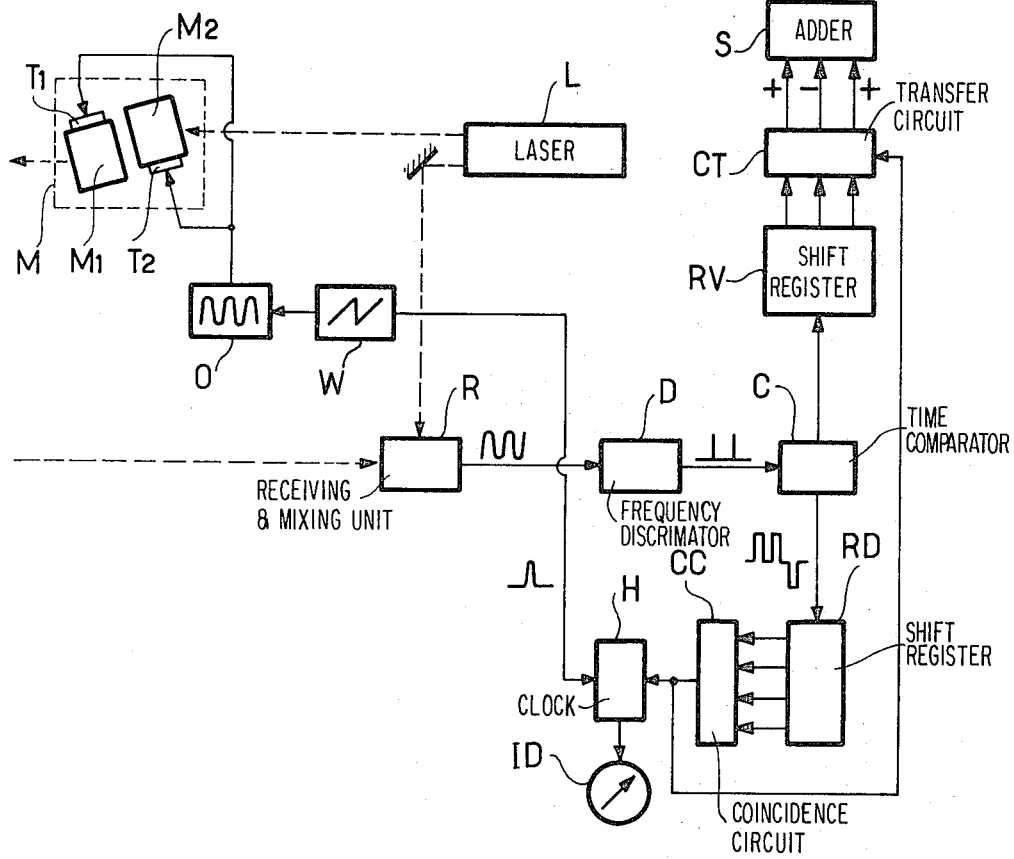
FIG. 2 shows a block diagram of a telemetry system according to the invention.

FIG. 2 shows a laser emitter L whose beam passes through a frequency modulator M which implements the Bragg effect. The modulator consists of two blocks M1 and M2 in which ultrasonic waves produced by transducers T1 and T2 are propagated. The operation of the Bragg effect modulators is well known. The interaction between the ultrasonic waves and the light within the blocks M1 and M2 cause, within each block, differences in frequency and a deviation in the direction of the light beam. These two blocks are arranged so that the angular deviations cancel out, whereas the differences in frequency are added together.

In FIG. 2, the light beams are shown by dashed lines, whereas the electrical connections are shown by solid lines.

The transducers T1 and T2 are supplied with alternating current at ultrasonic frequency by an oscillator O. The assembly comprising the laser L, the modulator M and the oscillator O constitutes the aforementioned scanning source.

The frequency of the oscillator O is controlled by a modulation generator W. The latter applies, to the oscillator O, a modulation signal comprising a succession of increasing and decreasing ramps in a pseudo random sequence, it being possible to show the modulation signal by the same diagram as that showing the frequency of the response signal in FIG. 1.

The response signal supplied by the target is received by a receiving and mixing unit R. This receiver receives, moreover, a reference light beam generated by the laser L.

It supplies an alternating electric signal whose frequency is equal to the difference between the frequency of the response signal received from the target and the aforementioned fixed reference frequency. That reference frequency is approximately equal to that of the reference beam supplied by the laser L to the receiver R. That receiver comprises means for transposing into a frequency enabling an output signal whose frequency is actually the aforementioned frequency to be obtained. The output signal of the receiving and mixing unit R is applied to a frequency discriminator D which supplies a pass signal each time the frequency of the signal it receives passes through zero.

The assembly formed by the receiving and mixing unit R and the frequency discriminator D constitutes the aforementioned frequency comparator. The pass signals supplied by the discriminator D are applied to a time comparator C. That comparator supplies the aforementioned equality or inequality signals, which correspond to the two values which the comparison signal may assume, to a shift register RD.

These equality or inequality signals constitute, at the same time, the clock signals for the shift register RD enabling the transfer of the contents from one stage of that register to the next.

The number of stages of the register RD is equal to the number of pseudo periods in the predetermined frequency pattern applied by the modulation generator W to the oscillator O.

The contents of the stages of the shift register RD are applied permanently to a coincidence circuit CC arranged so that when the contents of the stages correspond to a predetermined sequence, that coincidence circuit supplies a return signal to a clock H. That predetermined sequence is chosen so as to correspond to the aforementioned frequency pattern, an inequality signal corresponding to a change in the type of ramp, and an equality signal corresponding to the fact that two ramps of the same type succeed one another. Consequently, shift register RD and coincidence circuit CC together form a sequence comparator.

The modulation generator W supplies, at the end of the modulation signal, to the clock H, a start signal which causes the starting of the clock. The return signal supplied by the coincidence circuit CC stops that clock, so that it marks a time proportional to the distance of the target. That time is displayed by means of a distance indicator element ID.

The time comparator C supplies, moreover, from the pass signals, interval signals which represent the short and long values of the time intervals between two successive pass signals.

As previously explained, the average intervals are not taken into account, for their value does not depend on the relative radial speed of the target.

These interval signals are applied to a shift register RV. The number of stages is equal to the number of changes in types of ramps during the aforementioned predetermined pattern. Each of these stages may contain not only a binary digit, but a set of binary digits corresponding to the value of an interval signal. Of course, the interval signals are supplied to the register RV in a digital form by the time comparator C. Each of the stages of the digital shift register RV is connected to an input of an adder S, through a transfer circuit CT so that when that transfer circuit is brought into action, that adder S works out the algebraic sum of the contents of the stages in the digital shift register RV. It is the aforementioned return signal supplied by the coincidence circuit CC which brings the transfer circuit CT into action. The algebraic signs assigned to the successive inputs of the adder S are alternating as has previously been explained. A speed indicator IV indicates the sum calculated by the adder S. That sum represents, indeed, in magnitude and in sign, as has previously been explained, the relative radial speed of the target.

By way of an example, the modulator M causes a frequency swing of 200 Mc/s, that is, the aforementioned high frequency is greater by 200 Mc/s than the aforementioned low frequency. The duration of a complete sequence of increasing and decreasing ramps is ten microseconds, the aforementioned pseudo period being one tenth of a microsecond, this corresponding to an uncertainty in the order of 15 meters concerning the distance of the target.

While the invention has been particularly shown and described with reference to the preferred embodiment thereof, it will be understood by those skilled in the art that various changes in form and details may be made therein without departing from the spirit and scope of the invention.

I claim:

1. A frequency modulation telemetry system comprising:

a. scanning means for causing an alternating scanning signal having an adjustable frequency to be propagated towards a target capable of sending an alternating response signal, whose frequency reproduces the variations in the frequency of the scanning signal, back to the telemetry system;

b. modulation generator means for controlling said scanning means by a modulation signal for creating a variation in the frequency of said scanning signal according to a predetermined pattern as a function of time, said predetermined pattern being a succession of two types of ramps, increasing and decreasing, which cause the frequency of the scanning signal to vary between a low and high frequency in a predetermined time interval called the "pseudo period," the succession comprising at least two consecutive ramps of the same type and at least two consecutive ramps of the opposite type, and for supplying a start signal having a predetermined time relationship with the pattern;

c. receiving means, sensitive to a variation in the frequency of the response signal according to the predetermined pattern, for supplying a return signal having a predetermined time relationship with the pattern;

d. chronometer means for receiving the start and return signals and measuring the time interval between these two signals, and for providing a distance indicating signal, determined by the interval which represents the distance of said target, wherein said receiving means comprises:

e. frequency discriminator means for supplying a pass signal each time the frequency of the response signal is equal to a predetermined reference frequency;

f. time comparator means for receiving the pass signals and supplying a comparison signal which has a first value each time the time interval between two successive pass signals is between two predetermined values, one value higher and one lower than the pseudo period, and which has a second value each time the time interval is not between the two predetermined values; and g. sequence comparator means for recording the succession order of the first and second values of the comparison signal, and supplying the return signal as soon as a thus recorded sequence of the first and second values is identical to a predetermined sequence corresponding to the predetermined pattern, wherein the first value signal corresponds to a succession of two ramps of the same type and the second value signal corresponds to a succession of two ramps of the two different types.

2. A telemetry system according to claim 1, wherein said time comparator means supplies an interval signal each time the time interval between two successive pass signals is not between two predetermined values on either side of the pseudo period, the interval signal representing the value of the time interval, said system including a summing means for supplying a summing signal which represents, in a predetermined number of consecutive interval signals, the sum of those which represent time intervals longer than the pseudo period, minus the sum of those which represent time intervals shorter than the pseudo period; and a speed indicator means for receiving the summing signal and indicating its value when the return signal is supplied.

3. A telemetry system according to claim 2, wherein said summing means comprises:

a. shift register means for receiving the interval signals wherein the number of stages is equal to the predetermined number of interval signals, each stage being capable of recording an interval signal and of transferring its contents into the following stage when a new interval signal is received; and b. adder means having several inputs each of which receives the signal recorded in a corresponding stage of said shift register means, the inputs having alternating algebraic signs assigned thereto, wherein the summing signal is the output signal of said adder means.

4. A telemetry system according to claim 1, wherein said scanning means comprises:

a. a laser emitter, and a Bragg effect frequency modulator including a piezo-electric transducer supplied by an electronic oscillator having an adjustable frequency controlled by said modulation generator means wherein the laser beam passes through said Bragg effect frequency modulator.

5. A telemetry system according to claim 1, wherein the reference frequency is the average frequency between the low frequency and the high frequency of the ramps, the ramps being linear.

* * * * *